Oct. 9, 1923.
M. M. WILCOX
1,470,413
METHOD FOR MAKING VALVES
Filed July 24, 1922
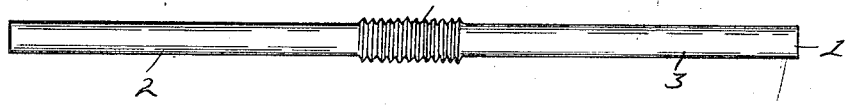
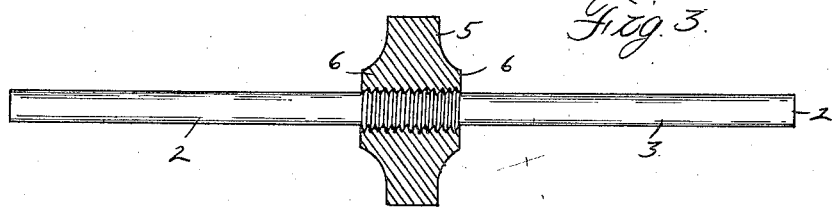
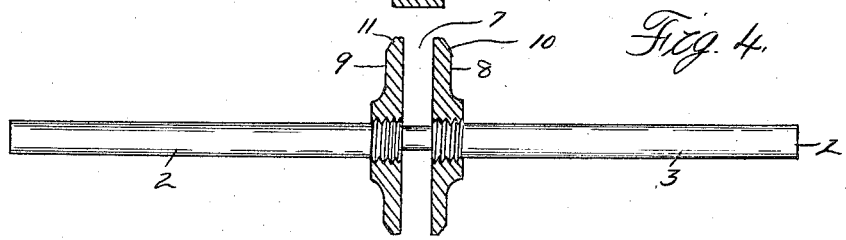
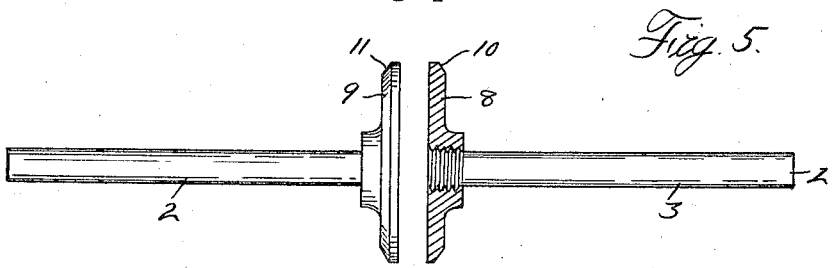
Inventor
Merril M. Wilcox
Attorneys Patented Oct. 9, 1923.

1,470,413

UNITED STATES PATENT OFFICE.

MERRILL M. WILCOX, OF SAGINAW, MICHIGAN.

METHOD FOR MAKING VALVES.

Application filed July 24, 1922. Serial No. 577,265.

*To all whom it may concern:*

Be it known that I, MERRILL M. WILCOX, a citizen of the United States of America, residing at Saginaw, in the county of Saginaw and State of Michigan, have invented certain new and useful Improvements in Methods for Making Valves, of which the following is a specification, reference being had therein to the accompanying drawings.

This invention relates to the manufacture of valves.

An object of the invention is to obtain a simple and inexpensive process by which the metal may be fashioned to the desired form without the use of large dies and expensive machinery.

With the above and other objects in view the invention consists of certain novel features of construction as will be more fully described and particularly pointed out in the appended claims.

In the accompanying drawing:

Figure 1 is an elevation of the stem employed in the construction of the valve;

Figure 2 is an elevation thereof after the threading operation;

Figure 3 is a sectional view of the cast head mounted on the threaded portion of the stem;

Figure 4 is a view similar to Figure 3, but showing the head after the machining and beveling operations;

Figure 5 is a view of the finished valves showing one in elevation and the head of the other in section.

Referring now to the drawing in which like characters of reference designate corresponding parts throughout the several views, the numeral 1 designates the preferred form of stem employed in the construction of my valve. This stem may be of any suitable material and may be made in various different forms in cross-section. The length of the stem is equal to the length of two ordinary valve stems, but it is immaterial so far as the manufacture of the valves is concerned whether the stem employed is an integral construction or composed of two separate sections. As shown, the stem is cylindrical in shape and is composed of two integral sections 2 and 3 respectively.

As illustrative of the preferred method of making the valves, the stem sections 2 and 3 are threaded as shown at 4. An oversized head 5 of circular formation having a slightly raised central boss 6 upon each side thereof is mounted on the threaded portions of the stem sections and, after being properly positioned, is welded thereto. If desired, the stem sections may be constructed to have a driving fit within the head instead of the threaded engagement as shown.

Following the welding operation, the center portion of the head 5 is machined as indicated at 7 to provide a pair of valve heads 8 and 9 respectively. After the machining operation the rear edge of each valve head is bevelled as shown at 10 and 11 respectively. The threaded portions of the stem sections between the valve heads 8 and 9 are then removed by a further machining operation and the finished valves produced.

Thus, by the use of a single oversized head, a pair of complementary valve heads may be quickly and easily formed. The stem sections are readily secured to the oversized head so that the two completed valves are constructed in a single operation.

While it is believed that from the foregoing description the nature and advantages of the invention will be readily apparent. I desire to have it understood that I do not limit myself to what is herein shown and described and that such changes may be resorted to when desired as fall within the scope of what is claimed.

What I claim as my invention is:

1. The method of making valves comprising the anchoring of an oversized head upon a pair of stem sections, and machining the head and stem sections.

2. The method of making valves comprising the anchoring of an oversized head upon a pair of integral stem sections, and machining the head and stem sections.

3. The method of making valves comprising the anchoring of an oversized head upon a pair of stem sections, machining the head to produce a pair of valve heads, and machining the stem sections between said valve heads.

4. The method of making valves comprising the welding of an oversized head to a pair of stem sections, and machining the head and stem sections.

5. The method of making valves comprising the anchoring of an oversized head upon a pair of integral stem sections, machining the head to produce a pair of valve heads, and removing the portions of said stem sections between said valve heads.

6. The method of making valves comprising the welding of an oversized head to a pair of stem sections, machining the central portion of said head to produce a pair of valve heads, and machining the stem sections between the valve heads.

7. The method of making valves comprising the anchoring of a head upon a pair of stem sections, machining the central portion of said head to produce a pair of valve heads, and removing the portions of said stem sections between said valve heads.

8. The method of making valves comprising the anchoring of an oversized head upon a pair of integral stem sections, machining the central portion of said head to produce a pair of valve heads, and removing the portions of the stem sections between said valve heads.

9. The method of making valves comprising the welding of an oversized head to a pair of integral stem sections, machining the head to produce a pair of valve heads, bevelling the rear edge of each of said valve heads, and removing the portions of said stem sections between said valve heads.

10. The method of making valves comprising the threading of a pair of integral stem sections, welding a head to the threaded portions of said stem sections, machining the head to produce a pair of valve heads, and machining the stem sections between said valve heads.

11. The method of making valves comprising the anchoring of an oversized head upon a pair of stem sections, and machining the central portion of said head and said stem sections to produce a pair of complementary valve members.

In testimony whereof I affix my signature.

MERRILL M. WILCOX.